Oct. 8, 1946.  E. O. LOWELL  2,408,787
INSERTED TOOTH MILLING CUTTER
Filed July 8, 1943
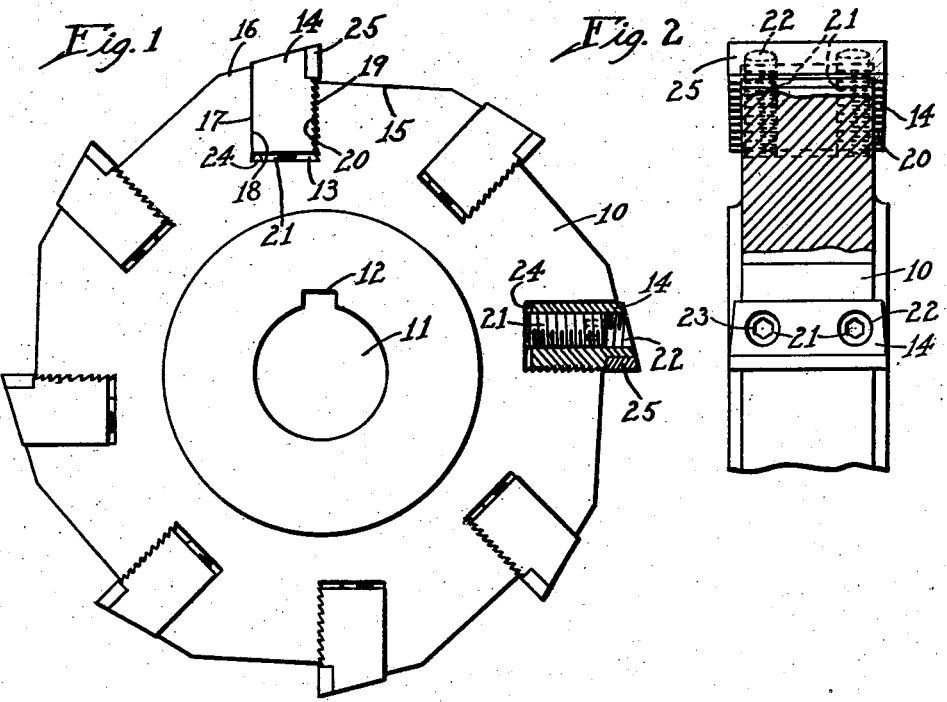
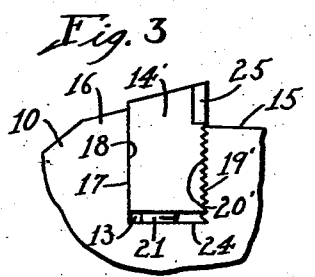
Inventor:
EDWARD O. LOWELL Patented Oct. 8, 1946

2,408,787

UNITED STATES PATENT OFFICE 2,408,787

INSERTED TOOTH MILLING CUTTER

Edward O. Lowell, South Pasadena, Calif., assignor, by mesne assignments, to Lowell and Grayson Manufacturing Company, Monrovia, Calif., a corporation of California Application July 8, 1943, Serial No. 493,815

5 Claims. (Cl. 29—105)

This invention relates to milling cutters of the inserted tooth type and is particularly concerned with improvements in the inserted teeth and the means for locking and holding the same securely.

The principal object of my invention is to provide a milling cutter of the type mentioned, in which the inserted teeth may be adjusted, removed, or replaced easily, and are arranged to be locked and held in place, so that they are extremely rigid and there is little likelihood of vibration, these features being particularly important where the inserted teeth are tipped with tungsten carbide, tungsten titanium carbide, or tungsten tantalum carbide, these materials being hard but not tough, and while possessing extraordinary resistance to wear are easily broken down if subjected to excessive vibration.

A salient feature of the milling cutter of my invention consists in the provision of precision flat contacting surfaces on the backs of the inserted teeth and the cooperating back walls of the slots, such contact together with the secure wedge locking action of interfitting serrations on the front faces of the inserted teeth and the front walls of the slots making for the best possible rigidity and eliminating danger of vibration of the inserted teeth during operation. In many earlier designs, interfitting serrations were required on the backs of the inserted teeth and the back walls of the slots, and, of course, it is well known that serrations cannot be produced as accurately as flat surfaces, and, as a result, the contact between the teeth and the walls of the slots was inclined to be more or less irregular, and, as a result, the teeth lacked rigidity and were subject to more or less vibration in operation.

Another salient feature of the milling cutter of my invention is the elimination of the conventional wedge heretofore employed, usually at least one for each inserted tooth, the inserted teeth, in accordance with my invention, relying upon the interfitting serrations on the front faces of the teeth and the front walls of the slots for the wedging action, thus simplifying the machining and reducing the number of parts required, so as to realize an important saving in cost, while in addition reducing the amount of material required to be cut away from the body, and accordingly strengthening the structure as a whole and increasing rigidity and reducing likelihood of vibration. Obviously, where wedges were required, there was introduced an additional factor of possible error that might account for looseness and lack of rigidity of the teeth, because, even assuming accurate machining of the body and teeth, there was no guarantee of the desired rigidity and tightness if the wedges, or the slots to receive the same, were not machined just as accurately as the rest of the unit. Hence, the importance in the elimination of the wedges. Furthermore, in many designs the use of wedges was objectionable because of the difficulty of loosening the same when adjustment or removal of teeth was necessary. The serrations provided on the teeth for wedgingly locking the same are preferably of a form providing maximum thrust of the tooth against the back wall of the slot to maintain the precision flat surfaces in firm contact, and yet when the screw, or screws, employed for holding the tooth are loosened there is nothing to interfere with the quick and easy adustment or removal of the tooth.

The invention is illustrated in the accompanying drawing, in which—

Figure 1 is a side view of a milling cutter made in accordance with my invention, showing one of the inserted teeth in section to better illustrate the construction;

Fig. 2 is an edge view showing two of the inserted teeth, one in front elevation and the other in end elevation, and Fig. 3 is a fragmentary side elevational view of a milling cutter showing a modified or alternative construction for the inserted teeth.

Similar reference numerals are applied to corresponding parts throughout the views.

Referring first to Figs. 1 and 2, the reference numeral 10 designates the body of a milling cutter having the usual center hole 11 and key slot 12. A plurality of substantially radial slots 13 are provided in the peripheral portion of the body in equally circumferentially spaced relation to receive the inserted teeth 14, in accordance with my invention. Where a positive or negative rake angle or helix angle for the teeth 14 is desired, instead of the neutral angle shown, the slots 13 may be inclined with respect to the radii or the axis accordingly, and, of course, this same observation applies in regard to the other form illustrated in Fig. 3. The periphery of the body is cut away in front of each slot 13, as at 15, for chip clearance, but the peripheral portion 16 of the body behind each slot is not cut away, whereby to provide precision flat bearing surface at 17 for good rigid support of the inserted teeth 14, these teeth being provided with precision flat back surfaces 18 for contact with the flat back walls 17 of the slots. The front wall of each slot has wedge lock serrations 19 provided therein to interfit in wedge lock serrations 20 provided in the front face of the tooth 14 inserted in the slot. The teeth 14 are adapted to be inserted in the slots from either side of the body, the wedge lock serrations having a close working fit. Consequently, after the teeth have become worn and require regrinding, the teeth can be removed and replaced one or more serrations removed from the original setting and then fastened in the new setting. A pair of set screws 21 is provided in each tooth threaded in holes 22 parallel to one another and to the flat back face 18 of the tooth and the serrated front face 20 but substantially at right angles to the direction of said serrations, and these screws are provided with sockets 23 in their outer ends for application of a wrench, and are arranged to be tightened against the flat inner end wall 24 of the slot. In the tightening of the screws the slight clearance in the interfitting serrations 19 and 20 is taken up and the tooth is forced bodily against the back wall 17 of the slot with great pressure, and the tooth is therefore held firmly in place with great rigidity and there is no danger of excessive vibration during operation. I refer to these serrations as of the buttress type because of the resemblance to the shape of buttress threads, but want to point out that whereas a buttress thread exerts force with minimum wedging and friction in relation to screw pressure, the serrations 19—20 are intended to give the opposite effect and provide maximum wedging and friction in relation to the force exerted by the set screws. Centrifugal force is also an important factor tending to tighten the inserted teeth and make for greater rigidity and, incidentally, greater safety. The flat face contact at 17—18 is particularly important from the standpoint of rigidity, because, as previously stated, flat surfaces such as these may be produced very accurately, whereas it is not practical to cut the serrations as accurately, and in many previous constructions which required the provision of interfitting serrations on the backs of the teeth and the back walls of the slots, the contact between the teeth and the slots was sufficiently irregular to result in vibration during operation. The flat surface contact taken together with the wedge locking action reduces to a minimum the likelihood of vibration during operation, and that is particularly important where the teeth are tipped, as indicated at 25, with a cemented carbide cutting edge member, because these materials are a product of powder metallurgy and although they possess extraordinary resistance to wear they are easily broken down when subjected to excessive vibration or not supported with sufficient rigidity.

The wedge lock serrations 19 and 20 are of the buttress type, but, as shown in Fig. 3, I may employ serrations 19' and 20' of conventional design. The tooth insert 14' illustrated, it will be understood, is otherwise of the same construction as the tooth inserts 14 of Figs. 1 and 2, having set screws 21 threaded therein to engage the flat bottom surface 24 of the slot 13 and cause the flat back surface 18 on the tooth to engage the flat back wall 17 of the slot. The construction of Fig. 3 will accordingly give substantially the same results and advantages as that shown in Figs. 1 and 2.

It is believed the foregoing description conveys a good understanding of the objects and advantages of my invention. The appended claims have been drawn with a view to covering all legitimate modifications and adaptations.

I claim:

1. A milling cutter of the inserted tooth type, comprising a rotatable body member provided with a substantially radial tooth receiving slot, a tooth in said slot, interfitting serrations on a wall of the slot and the adjacent face of the tooth, said serrations extending generally longitudinally of the axis of rotation of the body, whereby the tooth is insertible and removable by movement laterally with respect to the body, and one or more fastening screws threaded in through-holes provided in the tooth in transverse relation to said serrations, said screws being threadable into engagement with the inner end of the slot to force the interfitting serrations into wedging engagement.

2. A milling cutter of the inserted tooth type, comprising a rotatable body member provided with a substantially radial tooth receiving slot, a tooth fitting closely in said slot, interfitting serrations on the front wall of the slot and the front face of the tooth, said serrations extending generally longitudinally of the axis of rotation of the body, whereby the tooth is insertible and removable by movement laterally with respect to the body, the back wall of the slot and the abutting back face of the tooth being flat and in a plane parallel to the plane of the serrations, and one or more fastening screws which with the interfitting serrations comprise the sole fastening means for the tooth, said screws acting between the body and tooth by abutment with the one and threaded engagement in the other and disposed substantially radially relative to the body in transverse relation to said serrations, whereby when said screws are tightened the tooth is placed under end thrust radially relative to the body member and clamped in its adjusted position by wedging engagement of the interfitting serrations, and the flat back face on the tooth is forced into tight engagement with the flat back wall of the slot.

3. A milling cutter of the inserted tooth type, comprising a rotatable body member provided with a substantially radial tooth receiving slot, a tooth in said slot, interfitting serrations on the front wall of the slot and the front face of the tooth, said serrations extending generally longitudinally of the axis of rotation of the body, whereby the tooth is insertible and removable by movement laterally with respect to the body, the back wall of the slot and the back face of the tooth being flat and in a plane parallel to the plane of the serrations, and one or more fastening screws threaded in through-holes provided in the tooth in transverse relation to said serrations, said screws being threadable into engagement with the inner end of the slot to force the interfitting serrations into wedging engagement and force the flat back face on the tooth into tight engagement with the flat back wall of the slot.

4. A milling cutter of the inserted tooth type, comprising a body member having substantially radial transverse slots, cutter insert members disposed in and closely fitting said slots, said cutter members having wedge-shaped serrations transversely in the front face thereof for adjustable slidable engagement in complementary serrations provided generally longitudinally of the axis of rotation of the body in the front wall of the slots adapted to be wedgingly engaged upon slight substantially radial movement of the cutter members relative to the body member, the back wall of the slots and the abutting back face of the cutter members being flat and parallel to the plane of the front wall of the slots and a tightening screw means within each cutter member cooperating with the body to cause such radial movement of the cutter members for wedging engagement of the aforesaid serrations and clamp said cutter member in place.

5. A milling cutter of the inserted tooth type, comprising a body member having substantially radial transverse slots, cutter insert members disposed in and closely fitting said slots, said cutter members having wedge-shaped serrations transversely in the front face thereof for adjustable slidable engagement in complementary serrations provided generally longitudinally of the axis of rotation of the body in the front wall of the slots adapted to be wedgingly engaged upon slight substantially radial movement of the cutter members relative to the body member, the back wall of the slots and the abutting back face of the cutter members being flat and parallel to the plane of the front wall of the slots and means for forcing the cutter members substantially radially outwardly with respect to said body member to cause wedging engagement of the aforesaid serrations, whereby to secure the cutter members in substantially immovable position.

EDWARD O. LOWELL.